United States Patent
Lindsay et al.

(10) Patent No.: US 6,352,575 B1
(45) Date of Patent: Mar. 5, 2002

(54) APPARATUS AND METHOD FOR CENTRALIZED RECOVERY OF VOLATILE ORGANIC COMPOUNDS

(75) Inventors: Mitchell H. Lindsay, Park City, UT (US); James D. Mavis, Jr., Mercer Island, WA (US)

(73) Assignee: CH2M Hill, Inc., Denver, CO (US)

( * ) Notice: Subject to any disclaimer, the term of this patent is extended or adjusted under 35 U.S.C. 154(b) by 0 days.

(21) Appl. No.: 09/588,152

(22) Filed: Jun. 5, 2000

(51) Int. Cl.[7] .............................................. B01D 53/14
(52) U.S. Cl. ............................ 95/184; 95/193; 95/211; 95/237; 96/234
(58) Field of Search .......................... 96/290, 234, 265; 95/161, 163, 165, 167, 169, 173, 174, 178, 179, 180, 184, 193, 194, 199, 209, 211, 237, 238, 239, 240

(56) References Cited

U.S. PATENT DOCUMENTS

| | | | |
|---|---|---|---|
| 3,230,690 A | * | 1/1966 | Nishioka |
| 3,232,027 A | * | 2/1966 | Lorenz et al. |
| 3,232,029 A | * | 2/1966 | Evans, Jr. |
| 4,043,769 A | * | 8/1977 | Nishino et al. |
| 4,138,230 A | * | 2/1979 | Thompson |
| 4,353,715 A | | 10/1982 | Mir et al. |
| 4,378,235 A | | 3/1983 | Cosper et al. |
| 4,383,838 A | | 5/1983 | Barten et al. |
| 4,541,967 A | | 9/1985 | Masaki |
| 4,574,005 A | | 3/1986 | Cobbs, Jr. et al. |
| 4,689,054 A | | 8/1987 | Vara et al. |
| 4,830,639 A | * | 5/1989 | Grunewald et al. |
| 4,871,450 A | | 10/1989 | Goodrich et al. |
| 5,017,351 A | * | 5/1991 | Rafson |
| 5,198,000 A | | 3/1993 | Grasso et al. |
| 5,330,563 A | * | 7/1994 | Yamase et al. |
| 5,529,612 A | * | 6/1996 | Troost |
| 5,618,333 A | * | 4/1997 | Bucholz, Jr. et al. |
| 5,634,962 A | | 6/1997 | Trahan et al. |
| 5,681,369 A | * | 10/1997 | Osborne |
| 5,772,734 A | | 6/1998 | Baker et al. |
| 5,882,522 A | | 3/1999 | Matsumoto et al. |
| 6,015,451 A | * | 1/2000 | Anderson et al. |

* cited by examiner

*Primary Examiner*—Duane S. Smith
(74) *Attorney, Agent, or Firm*—Swanson & Bratschun, L.L.C.

(57) ABSTRACT

An appartus for removing VOC from a plurality of remotely located sources of VOC contaminated gas streams includes a plurality of liquid absorbers, each located near and communicating with a source of a VOC contaminated gas stream, the liquid absorbers associating the VOC with a scrubbing liquid. A conduit is connected to each liquid absorber for conveying VOC laden scrubbing liquid from the liquid absorber to a separating apparatus in fluid communication with each of the conduits. The separating apparatus receives the VOC laden scrubbing liquid from the plurality of liquid absorbers and separates the VOC from the scrubbing liquid. A conduit recycles the scrubbing liquid from the separating apparatus to at least one of the plurality of liquid absorbers. A method for removing VOC from a plurality of remotely located sources of gas streams contaminated with VOC includes contacting each VOC contaminated gas stream with a scrubbing liquid close to the VOC containing gas stream source to associate the VOC with the scrubbing liquid. The VOC laden scrubbing liquid from the various sources is conveyed to a single separator and the VOC is separated from the scrubbing liquid at the separator.

21 Claims, 1 Drawing Sheet

APPARATUS AND METHOD FOR CENTRALIZED RECOVERY OF VOLATILE ORGANIC COMPOUNDS

TECHNICAL FIELD

The present invention is directed toward air pollution control equipment, and more particularly toward an apparatus and method for recovery of volatile organic compounds (VOC) from an air stream.

BACKGROUND ART

Pollution of the atmosphere by VOC is a pervasive problem. Control of VOC emissions from large, discreet sources can be accomplished relatively efficiently and economically. Much more difficult to tackle has been the problem of VOC emissions from smaller discrete sources dispersed within a large facility. For example, an automobile assembly plant or other large scale manufacturing facility may engage in operations such as degreasing and painting in remote locations. In some cases, the plant operators simply vent the VOC contaminated air stream to the atmosphere without further treatment. Not only does this have a detrimental impact on the environment, it may also be a violation of state and federal air pollution laws. The prior art has tended toward pollution control apparatus associated with each remotely located source of VOC contaminated air. Some facilities attempt to capture the VOC for disposal. Others attempt to recover the VOC for reuse. Those facilities capturing the VOC for disposal are subject to more stringent emission control standards than those recovering the VOC for reuse.

Methods and apparatus for recovering VOC contaminants from a gas stream are known in the art. Representative is Grasso, U.S. Pat. No. 5,198,000. Grasso discloses subjecting a VOC laden air stream to an absorption apparatus such as a packed column using a scrubbing liquid which absorbs the VOC from the gas stream and discharges the treated gas into the atmosphere. Grasso further teaches that the VOC laden scrubbing liquid is subjected to a separation apparatus which may be a distillation column, stripping column, evaporator, membrane stripping device or the like. The separated scrubbing liquid is recycled to the absorption apparatus and the VOC is captured for reuse or disposal.

While the apparatus of Grasso has the advantage of capturing the VOC for reuse and thus qualifying for less stringent emissions standards associated with recovery processes, Grasso contemplates associating an entire system of absorption, separation and recovery with each source of a VOC contaminated gas stream. The problem with such an apparatus and method is that the separation apparatus typically operates most efficiently when it can be run continuously. Continuous operation may not be possible if the absorption apparatus requires servicing or if the VOC laden air stream is not continuously produced. In addition, economies of scale can be achieved by providing large volumes of VOC laden scrubbing liquid for separation. Providing a centralized apparatus as taught by Grasso to which VOC contaminated gas streams are transported via ducts from remote locations is not a viable solution because of the large volume of the ducts necessary for such transport, the problem of VOC deposition within the ducts and the possibility of leaks of harmful VOC from the ducts to within a facility.

The present invention is directed toward overcoming one or more of the problems discussed above.

SUMMARY OF THE INVENTION

A first aspect of the present invention is an apparatus for removing VOC from a plurality of remotely located sources of VOC contaminated gas streams. The apparatus includes a plurality of liquid absorbers, such as stripping towers, each located near and communicating with a source of a VOC contaminated gas stream. The liquid absorbers associate the VOC with a scrubbing liquid. A conduit is coinected to each liquid absorber for conveying VOC laden scrubbing liquid from the stripping tower to a separator in fluid communication with each of the conduits. The separator receives the VOC laden scrubbing liquid from the plurality of liquid absorbers and separates the VOC from the scrubbing liquid. The apparatus may further include a conduit for recycling the scrubbing liquid from the separator to at least one of the plurality of stripping towers. A scrubbing liquid reservoir may be provided in fluid communication with the separator for receiving the separated scrubbing liquid. A recirculating conduit may further be provided in fluid communication between the scrubbing liquid reservoir and an inlet to the separator with a valve in fluid communication with the recirculating conduit selectively recirculating separated scrubbing liquid to the separator. The separator is preferably a distillation column and the liquid absorber is preferably a stripping tower. A heat exchanger may be provided in operative association between the separated scrubbing liquid and the VOC laden scrubbing liquid to be received in the distillation column for transferring heat from the separated scrubbing liquid to the VOC laden scrubbing liquid before it enters the distillation column. A buffer reservoir may be provided in fluid communication between the VOC laden scrubbing liquid conduits and the separator. A regulator provides a select rate of flow of VOC laden scrubbing liquid from the buffer reservoir to the separator. In a highly preferred embodiment, the scrubbing liquid reservoir is in fluid communication with the buffer reservoir and a valve in fluid communication with the recirculating conduit selectively recirculates separated scrubbing liquid to the buffer reservoir as required to maintain a select rate of flow of scrubbing liquid and VOC laden scrubbing liquid to the separator.

A second aspect of the present invention is a method for removing VOC from a plurality of remotely located sources of gas streams contaminated with VOC. Tile method includes contacting each VOC contaminated gas stream with a scrubbing liquid close to the VOC containing gas stream source to associate the VOC with the scrubbing liquid. The VOC laden scrubbing liquid is conveyed to a single separator. There the VOC is separated from the scrubbing liquid. The separation of the VOC from the scrubbing liquid may be accomplished by distillation. If so, heat is preferably exchanged between the scrubbing liquid separated from the VOC and the VOC laden scrubbing liquid before distillation of the VOC laden scrubbing liquid. The separated scrubbing liquid is preferably recycled to repeat the contacting, conveying and separating steps. The separated scrubbing liquid may be collected in a first reservoir and selectively recirculated from the first reservoir by combining it with VOC laden scrubbing liquid before the separating step. The VOC laden scrubbing liquid may be stored in a second reservoir before the separating step. The release of the VOC laden scrubbing liquid is controlled from the second reservoir to the separating step to provide a substantially constant rate of delivery of VOC laden scrubbing liquid to the separating step. In a highly preferred embodiment, VOC laden scrubbing liquid is provided from the second reservoir to the separating step at a substantially constant select rate and scrubbing liquid from the first reservoir is provided to the second reservoir as required to maintain a select rate.

The apparatus and method for recovery of volatile organic compounds of the present invention allows for capturing and conveyance of VOC in a liquid state, thereby dramatically decreasing the volume as compared to the volume of the VOC contaminated gas stream. This makes conveyance of the VOC laden scrubbing liquid significantly easier than conveyance of a VOC contaminated gas stream. In addition, conveyance of the VOC laden scrubbing liquid presents a much smaller risk of leaking and exposure of the VOC to a work environment than conveyance of a VOC contaminated gas stream. Finally, conveyance of a VOC laden scrubbing liquid virtually eliminates a problem of deposits of VOC during conveyance. The method and apparatus further provides for consolidation of VOC laden scrubbing liquid from a number of remotely located sources at a single separating apparatus. This allows for economies of scale in constructing a single large separating apparatus as opposed to many discretely located small separating apparatus. This advantage can be particularly acute when the separation is conducted in a distillation column where efficient operation of the distillation column requires a continuous supply of VOC laden scrubbing liquid. Incorporation of the reservoirs for separated scrubbing liquid and the VOC laden scrubbing liquid provides a buffer insuring a continuous supply of liquid for distillation. Thus, individual liquid absorbers can be brought off-line for servicing or repair without having to shut down the separator. The overall efficiency of the system can be enhanced by providing for heat exchange between the separated scrubbing liquid and the VOC containing scrubbing liquid before the VOC containing scrubbing liquid enters the distillation column. The system is also substantially closed, thereby providing capture of both the VOC and the scrubbing liquid for reuse. Because the method and apparatus are a recovery system, lower VOC removal efficiencies from the VOC contaminated gas streams are permitted by regulation than with disposal systems, thereby making compliance with enviromnental regulations easier.

DETAILED DESCRIPTION OF THE PREFERRED EMBODIMENT

Figure 1:
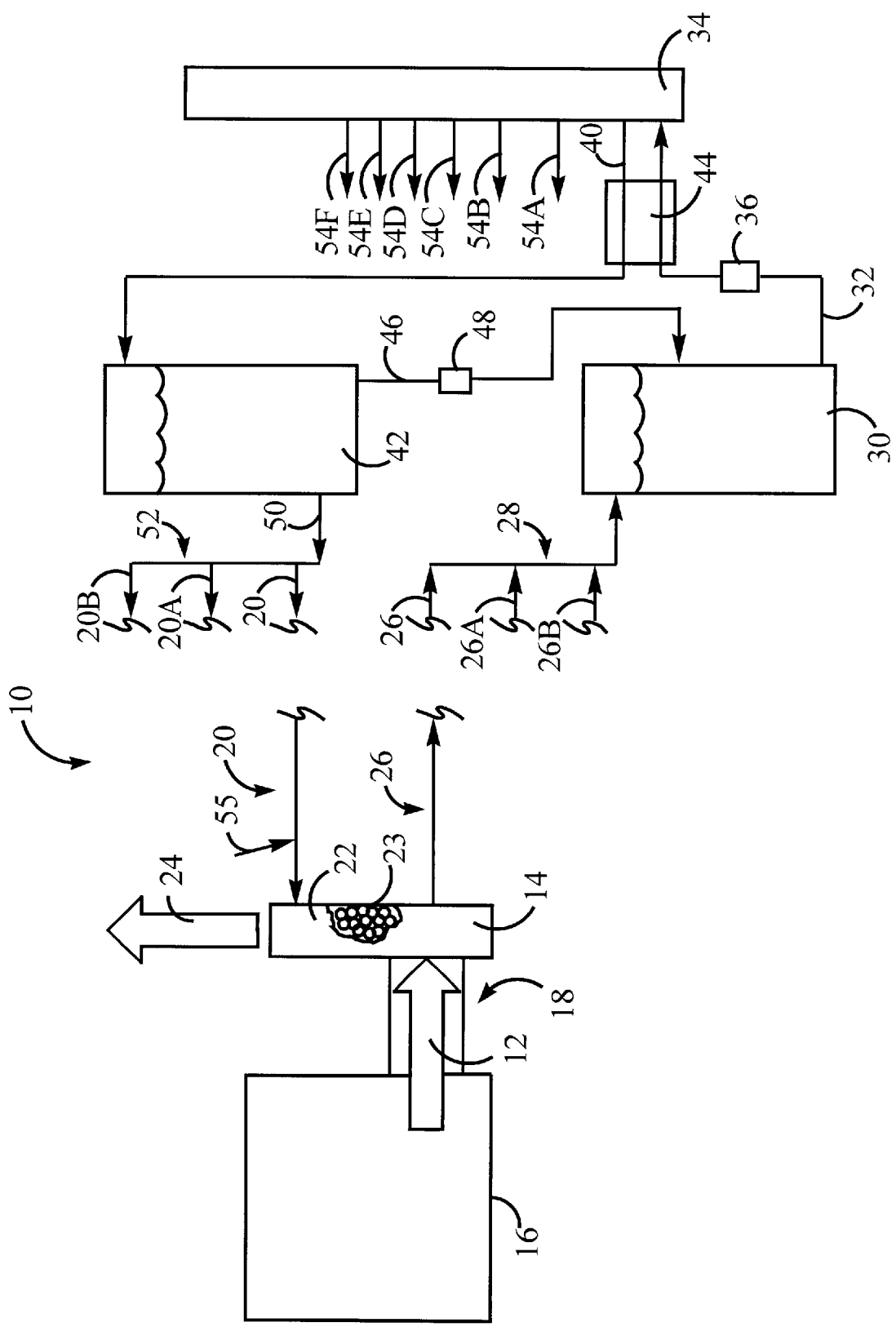
FIG. 1 is a schematic representation of an apparatus for recovery of volatile organic compounds of the present invention.

The apparatus for recovery of volatile organic compounds 10 of the present invention is shown schematically in FIG. 1. A VOC contaminated gas stream 12 enters a liquid absorber 14 from one of a variety of sources of a VOC contaminated gas stream 16. The source 16 may include, by way of example, a paint booth, a degreasing booth, a stripping station or the like. Typically, there are a variety of sources of VOC in a large manufacturing facility and these sources are remotely located from one another. The apparatus 10 contemplates that the VOC contaminated gas stream 12 is conveyed to an associated liquid absorber 14 through a duct 18.

The liquid absorber 14 can be any one of a number of apparatus for promoting absorption of VOC from the gas stream by a scrubbing liquid. By absorption, we mean the transfer of a soluble component from a gas-based mixture into a scrubbing liquid wherein the volatility of the scrubbing liquid is low under the process conditions. In addition to capture of a gas phase of a VOC, the liquid absorber also absorbs suspended liquid droplets of VOC. The liquid absorber 14 may be a packed column, a tray column, a wet-wall or falling film column, a bubble column, a spray chamber, a membrane system or an agitated vessel. The scrubbing liquid and the gas may be contacted in a batch process, e.g., in an agitated vessel, or in a continuous process, e.g., in a packed column. In the preferred embodiment, the absorption apparatus is a packed stripping column. In this embodiment, the scrubbing liquid is introduced through a conduit 20 to the top of a column 22 that is filled with a packing medium 23, commonly plastic "saddles" or "balls." As the scrubbing liquid flows by force of gravity over the packing medium, a large surface area of scrubbing liquid is formed for increasing the gas/liquid interface. The purged gas stream 24 which has been subjected to removal of VOC is exhausted to the atmosphere at the top of the stripping column 22. If required, the purged gas stream 24 can flow to one or more liquid absorbers or stripping columns to provide a select level of VOC removal. The VOC laden scrubbing liquid exits the bottom of the stripping column 22 through outlet conduit 26.

The liquid absorber 14 may be internal to or an integral part of the VOC contaminated air stream source 16. In any event, a liquid absorber 14 is located near each VOC contaminated air stream source. Outlet conduits 26A and 26B representing outlet conduits from liquid absorbers (not shown) identical to but located remotely from liquid absorber 14. Outlet conduits 26, 26A and 26B combine at a receiving manifold 28 and flow into a buffer reservoir 30. A conduit 32 connects the buffer reservoir with a separating apparatus 34 for separating the VOC from the scrubbing liquid. The separating apparatus 34 is preferably a fractionating distillation column, although it may be a stripping column, an evaporator, a membrane stripping device or any other apparatus suitable for separating solids for disposal, VOC for reuse and scrubbing liquid for recirculation. A valve or flow regulator 36 is provided in fluid communication with the conduit 32 to provide VOC laden scrubbing liquid from the buffer reservoir 30 to the separating apparatus 34 at a substantially constant, select rate of flow. Separated scrubbing liquid exits the separating apparatus 34 through return conduit 40 which drains into a scrubbing liquid reservoir 42. Where the separating apparatus functions by heating the VOC laden scrubbing liquid to effect separation, for example in the preferred embodiment where the separating apparatus is a fractionating distillation column, a heat exchanger 44 is operatively associated with the return conduit 40 and the conduit 32 to allow for the exchange of heat from the separated scrubbing liquid and the VOC laden scrubbing liquid before the VOC laden scrubbing liquid enters the separating apparatus 34. A recirculating conduit 46 provides for fluid communication between the scrubbing liquid reservoir 42 and the buffer reservoir 30. A flow control such as a valve or flow regulator 48 is in fluid communication with the recirculating conduit and allows for selective recirculation of separated scrubbing liquid to the buffer reservoir 30. This ensures a constant supply of liquid to maintain continuous operation of the separating apparatus 34. For example, the rate of flow from the scrubbing liquid reservoir 42 to the buffer reservoir 30 can be adjusted as required to maintain a select flow rate from the buffer reservoir to the separating apparatus 34. Recycling conduit 50 connects to a distribution manifold 52 which is in fluid communication with a number of scrubbing liquid conduits 20, 20A, 20B. Scrubbing liquid conduits 20, 20A and 20B return the separated scrubbing liquid to the various remotely located liquid absorbers, as illustrated with respect to scrubbing liquid conduit 20 and liquid absorber 14.

In the preferred embodiment, where the separating apparatus 34 is a fractionating distillation column, the VOC separated from the scrubbing liquid by the separating apparatus exits the separation apparatus in its constituent pairs through a number of outlet conduits 54A–54F. Representative VOC could include ethers, methylethyl ketone, isopropyl alcohol, methyl chloride, acetone and toluene. Those skilled in the art will recognize that the above list of examples is not exhaustive and in fact the VOC recovered will be a function of the VOC introduced into the recovery apparatus from the various sources of VOC contaminated gas streams.

Make up scrubbing liquid 55 is provided to each of the scrubbing liquid conduits 20, 20A and 20B from a second scrubbing liquid reservoir (not shown) to insure an adequate supply of scrubbing liquid to the liquid absorber 14. Although not shown, those skilled in the art will appreciate that various pumps and valves can be provided in the system as needed to insure continuous circulation of the VOC laden scrubbing liquid, the separated scrubbing liquid, make up scrubbing liquid and recovered VOC.

Condensers (not shown) can be provided in fluid communication with the outlet conduits 54A–54F to form condensed VOC streams. The condensed VOC streams may be reclaimed as a resource rather than being dumped in a landfill, discharged to the atmosphere or otherwise being disposed of. For example, the condensed VOC can be recombined, as appropriate, and returned to the source of VOC laden air 16 for use in the industrial process creating the VOC contaminated air stream.

The apparatus and method for recovery of VOC in accordance with the present invention allows for the safe and efficient conveyance of VOC laden scrubbing liquid from a number of remotely located liquid absorbers for separation of the VOC from the scrubbing liquid at a single separation apparatus. This enables efficiencies of scale in the building and operation of separating apparatus, lowering construction and operating costs. By providing the buffer reservoir which in turn is in fluid communication with the scrubbing liquid reservoir, a constant supply of scrubbing liquid to the separation apparatus can be insured, thereby enabling continuous operation of the separating apparatus and the highest degree of efficiency. Because the system allows for recovery and reuse of the VOC, it constitutes a recovery apparatus and therefore does not require as high a removal efficiency of the VOC at the liquid absorber as is required in an adsorption or an abatement apparatus that does not allow recovery. All these many advantages are achieved by a unique combination of known elements which can be produced relatively inexpensively, are highly reliable and can be operated very efficiently.

What is claimed is:

1. An apparatus for removing volatile organic compounds (VOC) from a plurality of remotely located sources of VOC contaminated gas streams, comprising:
   a plurality of liquid absorbers, each located near and communicating with a source of a VOC contaminated gas stream, the liquid absorbers associating the VOC with a scrubbing liquid;
   a conduit connected to each liquid absorber for conveying VOC laden scrubbing liquid from the liquid absorber; and
   a separating means for separating the VOC from the scrubbing liquid having an inlet in fluid communication with all of the conduits receiving the VOC laden scrubbing liquid from the plurality of liquid absorbers.

2. The apparatus of claim 1 further comprising a conduit for recycling the separated scrubbing liquid from the separator means to at least one of the plurality of liquid absorbers.

3. The apparatus of claim 1 further comprising a scrubbing liquid reservoir in fluid communication with the separator means for receiving the separated scribbing liquid.

4. The apparatus of claim 3 further comprising:
   a recirculating conduit in fluid communication between the scrubbing liquid reservoir and the separator means inlet; and
   a valve in fluid communication with the recirculating conduit, the valve selectively recirculating separated scrubbing liquid to the separator means.

5. The apparatus of claim 1 wherein the separator means is a distillation column.

6. The apparatus of claim 5 further comprising a heat exchanger operatively associated with the separated scrubbing liquid and the VOC laden scrubbing liquid to be received in the distillation column for transferring heat from the separated scrubbing liquid to the VOC laden scrubbing liquid before it enters the distillation column.

7. The apparatus of claim 1 further comprising a buffer reservoir in fluid communication between all ofthe conduits receiving the VOC laden scrubbing liquid and the separator means inlet.

8. The apparatus of claim 7 further comprising means for providing a select rate of flow of VOC laden scrubbing liquid from the buffer reservoir to the separator.

9. The apparatus of claim 8 further comprising a scrubbing liquid reservoir in fluid communication with the separator means for receiving the separated scrubbing liquid;
   a recirculating conduit in fluid communication between the scrubbing liquid reservoir and the buffer reservoir; and
   a valve in fluid communication with the recirculating conduit, the valve selectively recirculating separated scrubbing liquid to the buffer reservoir.

10. The apparatus of claim 1 wherein one or more of the liquid absorbers is a packed stripping column.

11. A method for removing volatile organic compounds (VOC) from a plurality of remotely located sources of gas streams contaminated with VOC, comprising:
    contacting each VOC contaminated gas stream with a scrubbing liquid close to the VOC containing gas stream source to associate the VOC with the scrubbing liquid;
    conveying the VOC laden scrubbing liquid to a single separator; and
    separating the VOC from the scrubbing liquid.

12. The method of claim 11 wherein the VOC contaminated gas stream is contacted with the scrubbing liquid in a packed stripping column.

13. The method of claim 11 wherein the VOC is separated from the scrubbing liquid by distillation.

14. The method of claim 13 further comprising exchanging heat between scrubbing liquid separated from the VOC and the VOC laden scrubbing liquid before distillation of the VOC laden scrubbing liquid.

15. The method of claim 11 fuirther comprising recycling the separated scrubbing liquid to repeat the contacting, conveying and separating steps.

16. The method of claim 11 further comprising collecting the separated scrubbing liquid in a first reservoir.

17. The method of claim 16 further comprising recirculating separated scrubbing liquid from the first reservoir by combining it with the VOC laden scrubbing liquid before the separating step.

18. The method of claim 11 further comprising storing the VOC laden scrubbing liquid in a second reservoir before the separating step.

19. The method of claim 18 further comprising controlling release of the VOC laden scrubbing liquid from the second reservoir to the separating step to provide a substantially constant rate of delivery of VOC laden scrubbing liquid to the separating step.

20. The method of claim 11 wherein the scrubbing liquid is mineral oil.

21. The method of claim 16 further comprising storing the VOC laden scrubbing liquid in a second reservoir before the separating step, providing the VOC laden scrubbing liquid to the separating step from the second reservoir at a substantially constant select rate and delivering separated scrubbing liquid from the first reservoir to the second reservoir as required to maintain the select rate.

* * * * *